United States Patent
Kralick et al.

[11] Patent Number: 5,645,407
[45] Date of Patent: Jul. 8, 1997

[54] BALANCED SINGLE STAGE LINEAR DIAPHRAGM COMPRESSOR

[75] Inventors: James Kralick, Albany; Nicholas Vitale, Watervliet, both of N.Y.

[73] Assignee: Mechanical Technology Inc., Latham, N.Y.

[21] Appl. No.: 450,357

[22] Filed: May 25, 1995

[51] Int. Cl.$^6$ .................................... F04B 9/103
[52] U.S. Cl. .................... 417/383; 417/413.1; 417/395; 310/17
[58] Field of Search ............... 417/413.1, 416, 417/417, 383, 365, 395; 310/17, 20, 28, 30

[56] References Cited

U.S. PATENT DOCUMENTS

| | | | |
|---|---|---|---|
| 4,092,829 | 6/1978 | Durenec | 92/90 R |
| 4,360,087 | 11/1982 | Curwen | 417/383 |
| 4,406,591 | 9/1983 | Louis | 417/383 |
| 4,450,685 | 5/1984 | Corey | 417/383 |
| 4,538,964 | 9/1985 | Brown | 417/383 |
| 4,924,675 | 5/1990 | Higham et al. | 414/417 |
| 5,074,755 | 12/1991 | Vincent | 417/384 |

Primary Examiner—Timothy S. Thorpe
Assistant Examiner—Roland G. McAndrews, Jr.
Attorney, Agent, or Firm—Kane, Dalsimer, Sullivan, Kurucz, Levy, Eisele and Richard,LLP

[57] ABSTRACT

This invention involves a balanced single stage linear compressor with an oil-filled cavity to equalize pressure on the diaphragm. The oil-filled cavity further includes a volume compensating gas chamber and a passive balancer. A balance mass is attached to the bellows and is supported by a fluid film bearing. The balance mass is arranged so that the oil displaced by the piston acts on the mass and displaces the mass in a direction opposite to that of the piston thereby balancing the apparatus.

14 Claims, 3 Drawing Sheets

5,645,407

BALANCED SINGLE STAGE LINEAR DIAPHRAGM COMPRESSOR

BACKGROUND OF THE INVENTION

1. Field of the Invention

This invention pertains to the use of both passive and active balancers for a cryocooler compressor, and to a hydraulically actuated compressor used for pumping fluids, and more particularly to a balanced single stage linear compressor with a free-floating diaphragm used to reduce the wear and tear usually associated with a more conventional piston-type compressor.

2. Description of the Prior Art

In the prior art, it is well known that the use of a transverse piston in a Stirling heat engine or similar apparatus results in a rocking motion about the center of mass of the engine, thereby putting a load on the engine displacer bearings and combustor assembly. In order to counteract these forces, a counterweight can be used as a passive balancer. For example, U.S. Pat. No. 4,450,685 to Corey discloses a hydraulically driven counterweight in a resonant free piston Stirling engine wherein the product of the piston mass and the piston stroke is equal to the product of the counterweight mass and stroke. While such a counterweight configuration counteracts a substantial portion (approximately 99%) of the potential vibration, there is some residual vibration due to losses in the elements and frictional effects.

Other relevant heat engine references include commonly-owned U.S. Pat. Nos. 5,022,229 and 5,109,673 to Vitale.

Similarly, in the prior art, it is known to use a diaphragm compressor, such as from U.S. Pat. No. 5,074,755. But such a configuration has several disadvantages. Firstly, in order to have a balanced system, two compressors are usually operated in an opposed configuration so that the compressors are 180° out of phase with each other.

Secondly, to insure that the two compressors are in fact 180° out of phase with each other, some form of active control on one or both of the compressors is necessary.

Thirdly, since cost is usually a significant consideration in the evaluation of a compressor, the use of two compressors has a distinct disadvantage of being more costly than a single larger compressor.

Finally, the space claim envelope of a balanced back-to-back compressor is larger than that of a single larger compressor.

Other references include U.S. Pat. No. 5,246,351 to Horn et al.; U.S. Pat. No. 5,192,198 to Gebauer et al.; U.S. Pat. No. 5,186,615 to Karliner; U.S. Pat. No. 5,145,331 to Goes et al.; U.S. Pat. No. 5,088,901 to Bräuer; and U.S. Pat. No. 4,430,048 to Fritsch.

OBJECTS AND SUMMARY OF THE INVENTION

It is therefore an object of this invention to provide a balanced compressor system and to remove the residual vibration of a transverse piston cryocooler compressor (or similar heat engine).

It is therefore a further object of this invention to eliminate the need for an active control loop.

It is therefore a still further object of this invention to minimize production costs.

It is therefore a still further object of this invention to achieve the above objectives while maintaining a long operating life, low maintenance cost and minimal fluid contamination for critical applications.

The apparatus of a first aspect of this invention is a cryocooler compressor with a piston driven by a linear motor, and includes a passive and active balancer. The passive balancer includes hydraulically driven counterweights wherein the product of the piston mass and the piston stroke is equal to the product of the counterweight mass and stroke in order to remove a substantial portion of the vibrations. Additionally, active balancers are used to remove the residual vibrations.

The apparatus of a second aspect of this invention is a single stage balanced linear compressor wherein the force required to displace the diaphragm comes from a hydraulic piston driven by a stationary linear motor. The cavity housing the piston and the motor is filled with oil thereby providing for nearly balanced pressure forces acting on the diaphragm.

The oil-filled cavity also houses a volume compensating gas chamber and a passive balancer. The volume compensating chamber is used to compensate for the static volumetric expansion of the oil during temperature variations from storage to maximum operating temperature. The gas chamber is connected to the discharge pressure side of the diaphragm by a capillary tube, and together with the compensating bellows, provides the necessary backing pressure to the diaphragm.

The arrangement of the gas chamber and bellows also provides for the dynamic volumetric variations due to the reciprocating piston in an oil-filled cavity. A balance mass is attached to the bellows and supported by a fluid film bearing. The piston acts on the balance mass via the displaced oil, and displaces the mass in a direction opposite to that of the piston. By matching the product of the mass times the displacement of the balancer to that of the piston's mass and displacement, the system becomes passively balanced.

BRIEF DESCRIPTION OF THE DRAWINGS

Further objects and advantages of the invention will become apparent from the following description and claims, and from the accompanying drawing, wherein:

DETAILED DESCRIPTION OF THE PREFERRED EMBODIMENTS

Figure 1:
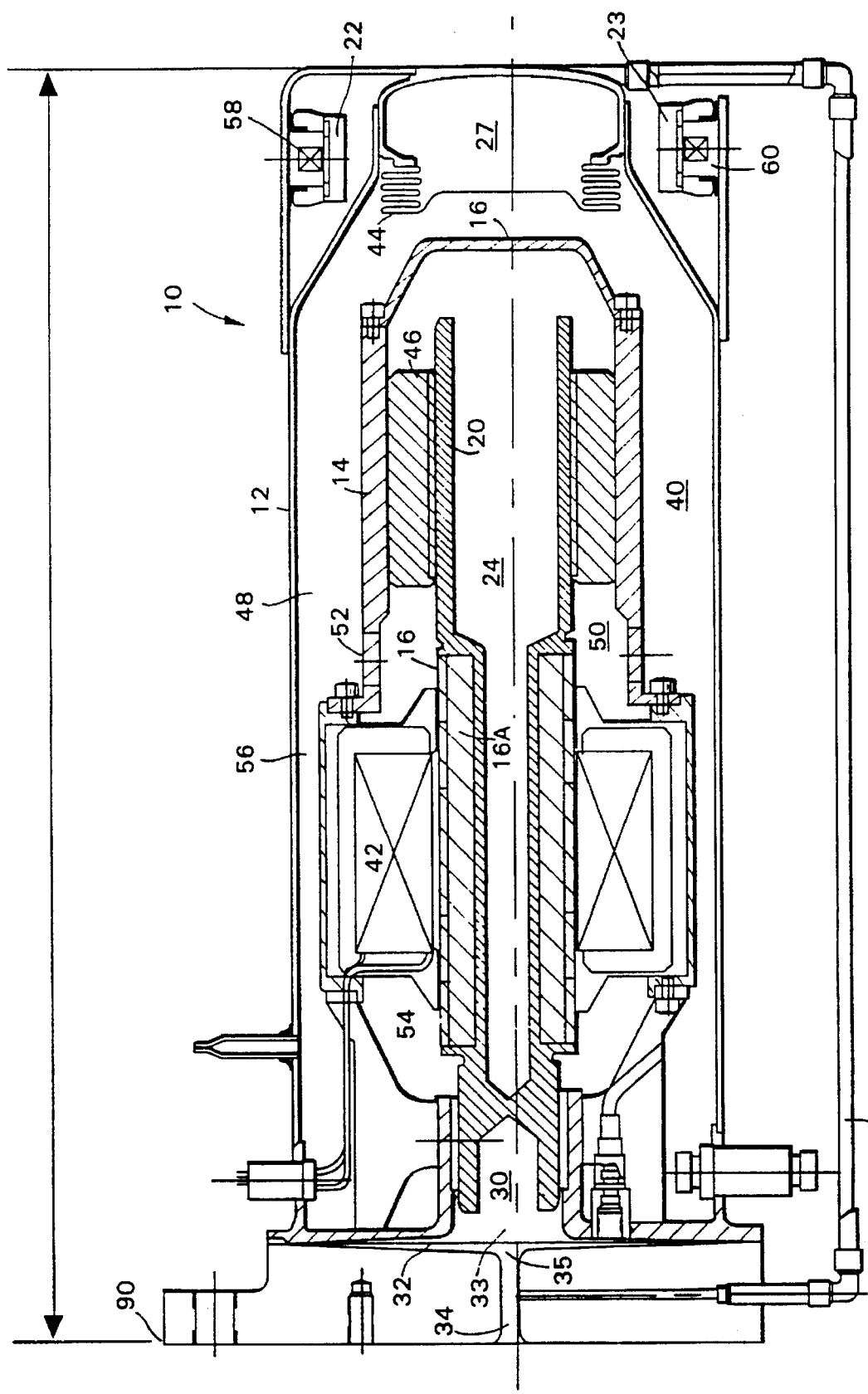
FIG. 1 is a cross-sectional side view of a first aspect of the apparatus of the present invention.

Referring now to the drawings, one sees that FIG. 1 is a cross-sectional side view of the apparatus 10, a valveless free piston compressor that can drive a regenerative cycle cryocooler (i.e., Stirling or Pluse-Tube cryocooler).

Apparatus 10 includes a pressure vessel 12 and an inner transverse cylinder 14 which supports the piston 20 and passive balance mass 46. The pressure vessel 12 is evacuated and completely filled with oil with the exception of the compensating volume 27 which is separated from the oil cavity 48 by a flexible bellows 44.

The piston 20 has a hollow inner rear section 24 and a hollow inner forward section 30 to reduce the amount of reciprocating mass. Mounted on this piston 20 is a set of circumferentially arranged magnets 16 and a laminated back-iron 16A. In this arrangement, the passive balance mass 46 is supported by the inner diameter of the transverse cylinder 14 on a fluid film bearing. The balance mass 46 is itself hollow, and supports the rear section of the piston 20 on its inner diameter by another fluid film bearing forming a common longitudinal axis for which both the passive balance mass 46 and piston 20 reciprocate. The rear of the transverse cylinder 14 is closed with a solid cap 16 and isolates the hollow rear oil filled cavity 24 of the piston 20 from the rest of the oil cavity 48. This arrangement provides for a hydraulic connection between the piston 20 and the passive balance mass 46. It can be seen that as the piston 20 moves to the right, the constant volume of oil in cavity 24 forces the balance mass to the left, and vice versa.

In the preferred embodiment, the product of the mass of the piston 20 and the piston stroke is equal to the product of the balance mass 46 and stroke in order to remove a substantial portion of the vibrations.

The transverse cylinder 14 has a series of radial holes 52 located toward the proximal end 90 of the balance mass 46 to allow oil to escape volume 50 and permit axial movement of both piston 20 and balance mass 46. Outwardly adjacent from the outer wall of cylinder 14 is an annular passage 56 which connects fluid volumes 54 to fluid volumes 50 and 40.

The forward section of the piston 20 is supported by the inner transverse cylinder 14 on a fluid film bearing. The space between the diaphragm 32 and the inwardly extending portion 30 forms an oil-filled chamber or hydraulic piston 33 which acts on and thereby displaces the diaphragm 32 laterally into and out of the compression space 35. It is this action of the diaphragm 32 which pumps fluid through passageway 34. Movement of the piston 20 is driven by a stationary cylindrical linear drive motor 42 which is built into and thereby forms a section of inner transverse cylinder 14.

External to the pressure vessel 12 is a cylindrical pipe 36 which contains a capillary tube which connects the compression space 35 to the compensating volume 27. As previously described, this is a vital aspect which allows the volume of the oil cavity 48 to change volume with the reciprocation of the piston 20 into and out of the hydraulic volume 30.

While the use of passive balancers 46 reduces a substantial percentage of the vibration which would otherwise occur, losses in the elements and frictional effects result in a residual portion of the vibration remaining. Therefore, active balancers 58, 60 are added outwardly adjacent and connected to the pressure vessel 12. Active balancers 58, 60 include electronic sensors which actively monitor the vibration levels of the pressure vessel 12 and drive smaller balance masses 22, 23 in direct opposition to these vibrations.

Figure 2:
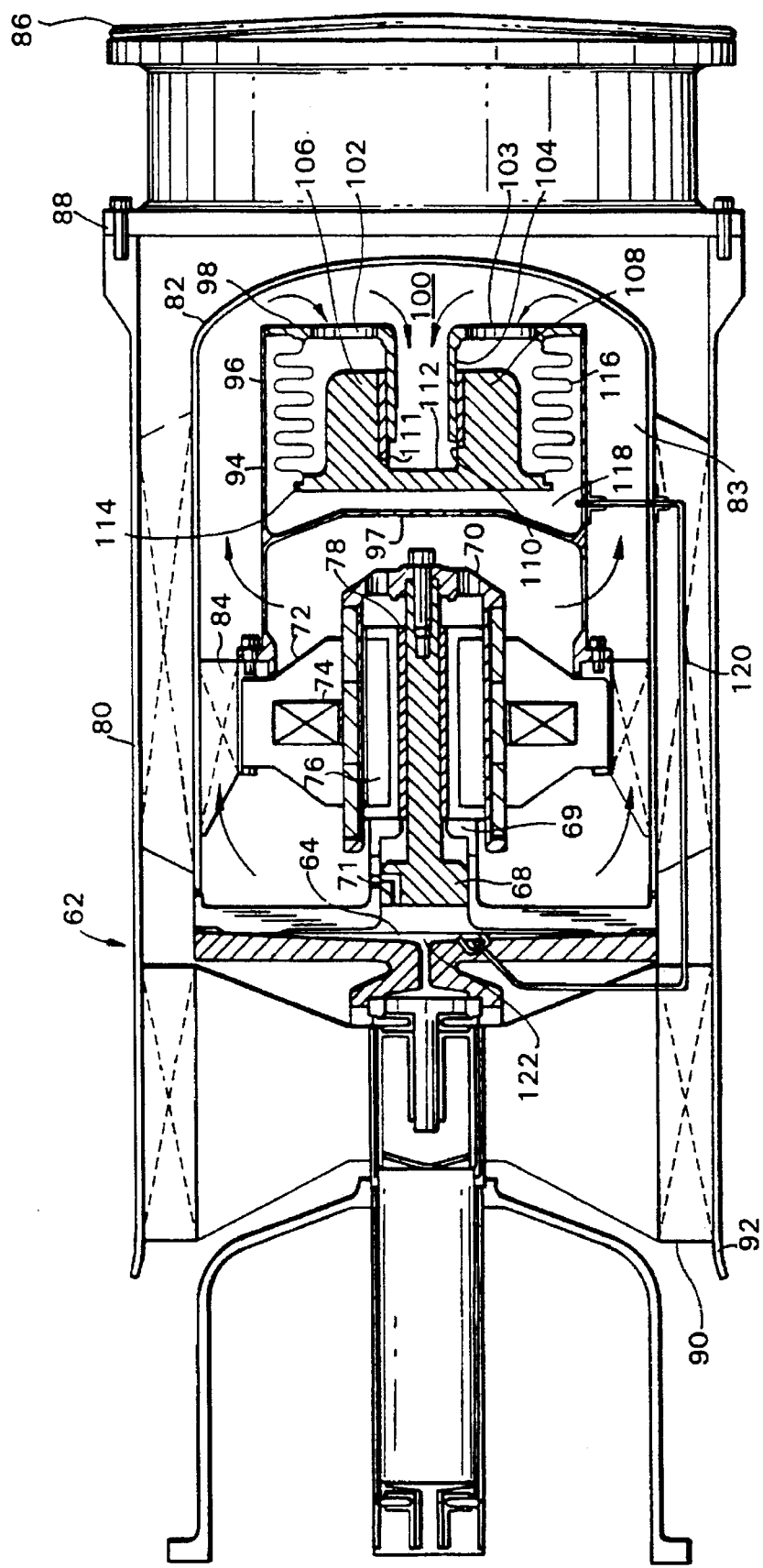
FIG. 2 is a cross-sectional view of a second aspect of the apparatus of the present invention.

FIG. 2 discloses a second aspect of the invention, a balance single stage linear compressor 62 includes a diaphragm 64 acting against a compression space 122. Diaphragm 64 is driven or displaced by a hydraulic piston plunger mass 68 reciprocating (horizontal reciprocation from the perspective of FIG. 2) within cylinder 69. Hydraulic piston mass is affixed to a hollow cylindrical plunger 70, which in turn is driven by a stationary linear motor 72 comprising an outer stator 74 and back-iron 76. Piston plunger mass 68 includes centering port 71. The piston plunger mass 68 runs along the longitudinal axis of hollow cylindrical plunger 70 and reciprocatingly slides along oil lubricated bearings 78 of stationary back-iron 76 which is concentric about piston plunger mass 68. Hollow cylindrical plunger 70 is likewise concentric about stationary back-iron and reciprocates in unison with piston plunger mass 68.

Balanced single stage linear compressor 62 further comprises an outer cylindrical shell 80 which serves as a housing for the entire linear compressor 62. Pressure vessel 82 is supported inwardly concentrically within outer cylindrical shell 80 and generally forms oil-filled cavity 83 and supports, by way of inwardly radially extending motor cooling fins 84, stationary linear motor 72 therewith. More particularly, motor cooling fins 84 extend radially outward from outer stator 74 and are secured onto the inward side of pressure vessel 82. Heat is thereby conducted from the outer stator 74 to the pressure vessel 82. The oil in oil-filled cavity 83 further distributes heat away from the outer stator 74 to pressure vessel 82. Fan 86, which is connected to the distal end 88 of the outer cylindrical shell 80, draws air in through the toroidal-shaped end 90 on proximal end 92 of outer cylindrical shell 80 thereby cooling pressure vessel 82. The heated air is then exhausted through fan 86.

Longitudinally outward from the hollow cylindrical plunger 70 and stationary linear motor 72 is balance mass support 94 which includes outer cylindrical wall 96 and a solid bulkhead plate 97 joined at the proximal end of the outer cylindrical wall 96. A doughnut-shaped end cap 98 is joined to a distal periphery of outer cylindrical wall 96 and includes both a central aperture 100 and axial oil vents 102, 103 on the body thereof. Balance mass support 94 further includes cylindrical balance mass guide 104 which extends longitudinally inward from aperture 100 directed toward proximal end 92. Cylindrical balance mass guide 104 serves as a guide for the balance mass 106 to reciprocate. Balance mass 106 includes a toroidal section 108 with an interior blind aperture 110 which forms a fluid (oil) film bearing 111 with cylindrical balance mass guide 104. Balance mass 106 further includes an end cap section 112 and a rim 114 therearound with a compensating bellows 116 extending from the rim 114 to the doughnut-shaped end cap 98 thereby further preserving the oil-tight seal. Oil is contained within the space formed between the doughnut-shaped end cap 98, balance mass 106 and compensating bellows 116. Volume compensating chamber 118 (filled with gas which is inherently compressible) is formed within the space between outer cylindrical wall 96 (of balance mass support 94), balance mass rim 114, bellows 116 and bulkhead plate 97. Located toward the proximal end of the bulkhead plate 97 is a series of radial holes in the cylindrical wall 96 which allows for a hydraulic connection between the piston plunger mass 70 and the balance mass 106.

Capillary tube 120 runs from volume compensating chamber 118 to the compression space volume 122 on the discharge pressure side of diaphragm 64. Capillary tube 120, along with compensating bellows 116, provides the necessary backing pressure to diaphragm 64. The volume compensating gas chamber 118 is further used to compensate for the static volumetric expansion of the oil during temperature variations from storage to maximum operating temperature.

The configuration of the volume compensating chamber 118 and the compensating bellows 116 causes reciprocation of the balance mass 106 in response to oil being forced inwardly and outwardly through aperture 100 and oil vents 102, 103. This inward and outward movement of oil through the aperture 100 and oil vents 102, 103 is caused by the reciprocation of piston 68 and cylindrical plunger 70 which changes the volume of oil-filled cavity 83. As the volume of oil is essentially incompressible, the changes in the volume of oil-filled cavity 83 due to reciprocation of piston 68 and plunger 70 are compensated for by reciprocation of balance mass 106 which changes the volume within the compensating chamber 118. Moreover, as the product of the mass times the displacement of the balance mass 106 is matched to that of the piston 68 and plunger 70 (and associated reciprocating masses), the linear compressor 62 becomes passively balanced.

The displacement of the balance mass 106 is proportional to the displacement of the piston 68 and plunger 70 (and associated reciprocating masses) by the ratio of the diameter of piston 68 to the mean effective diameter of the compensating bellows 116.

That is, the displacement of the balance mass 106 equals the displacement of the total reciprocating piston 68 and plunger 70 masses multiplied by the diameter of the piston 68 divided by the effective diameter of the compensating bellows 116.

Similarly, the mass of the balance mass 106 equals the mass of the piston 68, plunger 70 and associated reciprocating masses times the displacement of the piston 68 divided by the displacement of the balance mass 106.

Because the oil-filled cavity 83 is completely filled with an incompressible oil, the two opposing forces work at the same frequency but 180 degrees out of phase thereby providing for a balanced system. Thus the several aforementioned objects and advantages are most effectively attained.

Figure 3:
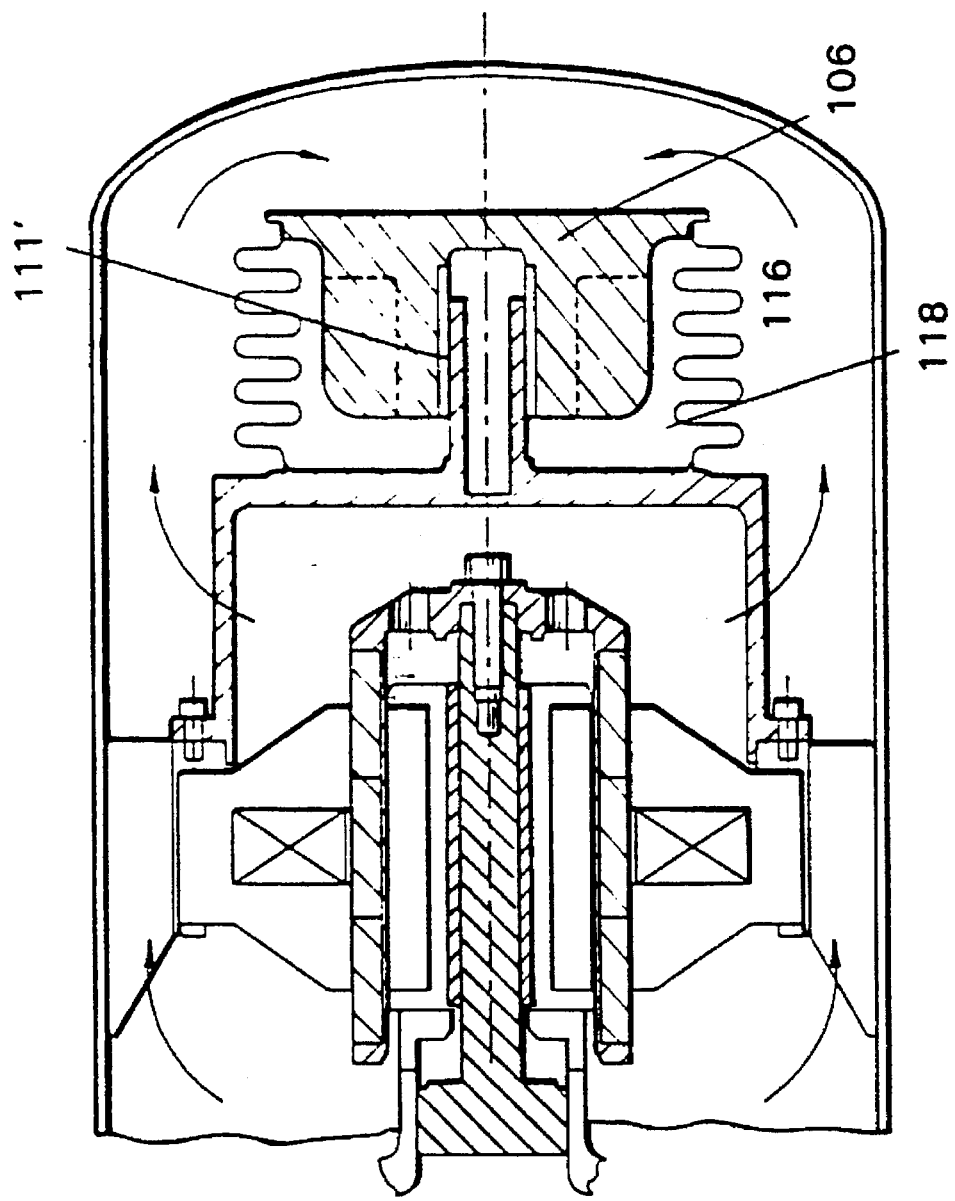
FIG. 3 is a cross-sectional view of an alternative embodiment of the second aspect of the apparatus of the present invention.

The configuration shown in FIG. 3 is an alternative embodiment from that shown in FIG. 2. While the balance mass 106 operates in a similar manner as shown in FIG. 2, the balance mass 106 is on the gas side 118 of the compensating bellows 116 and the bearing 111' run dry and have life problems plus the potential for fluid contamination from bearing wear debris.

Although preferred embodiments of the invention have been disclosed and described in detail herein, it should be understood that this invention is in no sense limited thereby and its scope is to be determined by that of the appended claims.

What is claimed is:

1. A compressor comprising:

a diaphragm with a first side and a second side;

a reciprocating piston means impinging upon a volume formed on a first side of said diaphragm;

driving means for reciprocating said piston means;

a reciprocating balance mass;

wherein said piston means and said balance mass reciprocate along a common longitudinal axis and said piston means and said balance mass are in communication with each other via a fluid-filled cavity whereby a change in position of said piston means changes a volume of said fluid-filled cavity thereby urging said balance mass to change position to compensate for changes in volume of said fluid-filled cavity, wherein reciprocation of said piston means and reciprocation of said balance mass are 180° out of phase thereby balancing the compressor during operation.

2. The compressor of claim 1 wherein said cavity is filled with oil.

3. The compressor of claim 2 wherein said balance mass includes a blind aperture which engages a cylindrical passageway from said cavity, said balance mass reciprocating by said blind aperture traversing said cylindrical passageway.

4. The compressor of claim 3 further including a bellows attached to said balance mass and a wall of said fluid-filled cavity and wherein said balance mass and said bellows separate a gas-filled cavity from said fluid-filled cavity.

5. The compressor of claim 4 wherein reciprocation of said balance mass changes a volume of said gas-filled cavity.

6. The compressor of claim 5 further including a gas communication line between said gas-filled cavity and a volume formed on said second side of said diaphragm.

7. The compressor of claim 6 further including a support structure for said balance mass, said support structure comprising:

a cylindrical wall concentric with said balance mass;

a doughnut-shaped wall with an exterior portion engaging a circumferential periphery of said cylindrical wall and an interior portion engaging a circumferential periphery of said cylindrical passageway engaging said blind aperture of said balance mass, further including fluid vents on said doughnut shaped wall, and further receiving an end of said bellows.

8. The compressor of claim 7 wherein said driving means comprises an electrically driven stator concentrically outward from said piston means.

9. The compressor of claim 8 further including a pressure vessel with inwardly extending motor cooling fins engaging said electrically driven stator.

10. The compressor of claim 9 further including a fan to draw air over said pressure vessel thereby cooling said pressure vessel, said motor cooling fins and said electrically driven stator.

11. The compressor of claim 2 wherein said balance mass includes a blind aperture which engages a cylindrical support, said balance mass reciprocating by said blind aperture traversing said cylindrical support.

12. The compressor of claim 11 further including a bellows attached to said balance mass and a wall of said fluid-filled cavity and wherein said balance mass and said bellows separate a gas-filled cavity from said fluid-filled cavity.

13. The compressor of claim 12 wherein reciprocation of said balance mass changes a volume of said gas-filled cavity.

14. The compressor of claim 13 further including a gas communication line between said gas-filled cavity and a volume formed on said second side of said diaphragm.

* * * * *